G. F. KERN.
SHOCK ABSORBER.
APPLICATION FILED SEPT. 1, 1909.
1,006,225.
Patented Oct. 17, 1911.
2 SHEETS—SHEET 1.
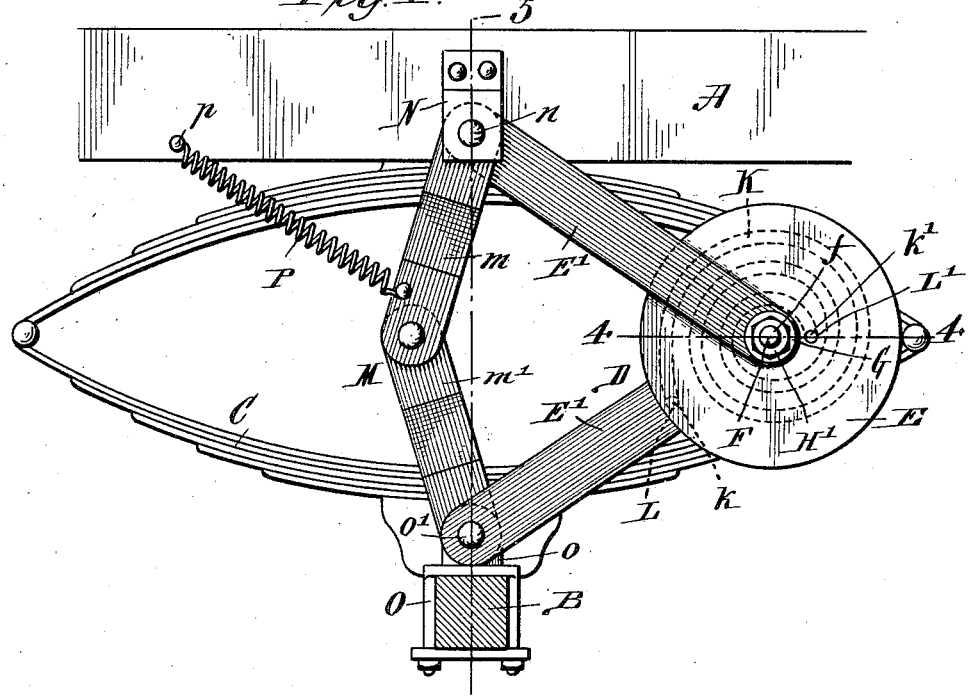
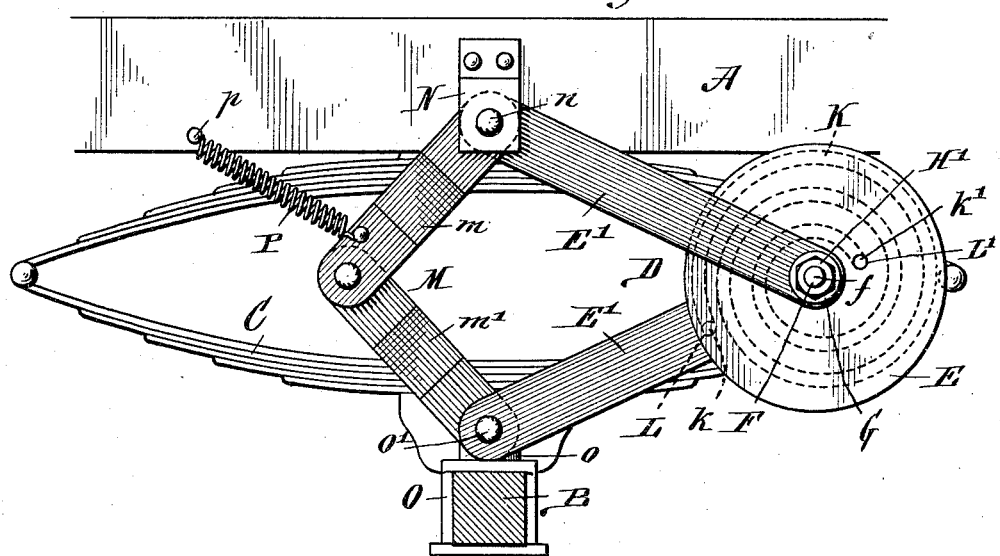
Witnesses:
Christ Feinle, Jr.
Jacob L. Oberst, Jr.
George F. Kern, Inventor.
By Emil Neuhart
Attorney.

G. F. KERN.
SHOCK ABSORBER.
APPLICATION FILED SEPT. 1, 1909.
1,006,225.
Patented Oct. 17, 1911.
2 SHEETS—SHEET 2.
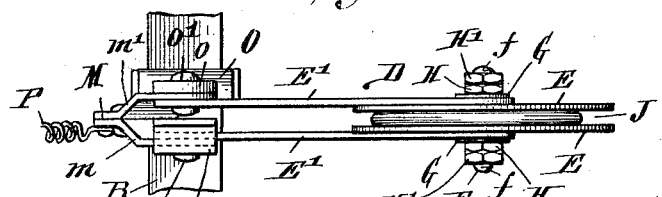
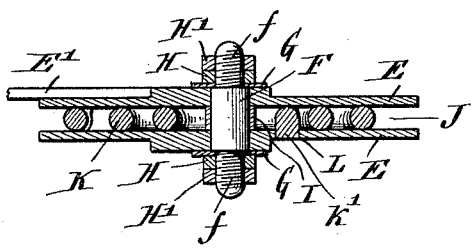
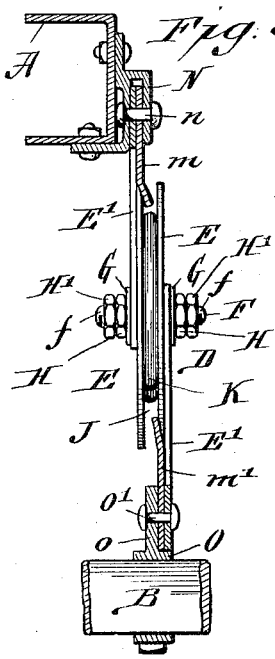
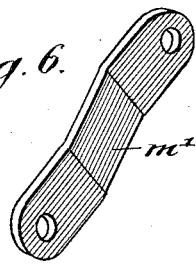
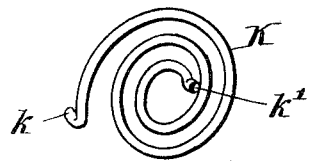
Witnesses
Christ Feinle, Jr.
Jacob S. Oberst Jr.
George F. Kern, Inventor.
By Emil Neuhart
Attorney

UNITED STATES PATENT OFFICE.

GEORGE F. KERN, OF BUFFALO, NEW YORK, ASSIGNOR OF ONE-HALF TO FREDERICK C. PFEIL, OF BUFFALO, NEW YORK.

SHOCK-ABSORBER.

1,006,225. Specification of Letters Patent. Patented Oct. 17, 1911.

Application filed September 1, 1909. Serial No. 515,601.

*To all whom it may concern:*

Be it known that I, GEORGE F. KERN, a citizen of the United States, residing at Buffalo, in the county of Erie and State of New York, have invented certain new and useful Improvements in Shock-Absorbers, of which the following is a specification.

My invention relates to shock-absorbers for vehicles and more especially for automobiles; the same operating in conjunction with the vehicle springs and serving to prevent excessive vibration of the springs and to check the recovery of the same after being subjected to undue movement in going over rough roads or encountering ruts or obstructions in the road.

The objects of my invention are to provide a simple and effective device of this character which is not liable to become easily disarranged and which can be quickly applied to or removed from a vehicle.

With these and other objects in view, my invention consists in the construction, arrangement, and combination of parts to be hereinafter described and particularly pointed out in the subjoined claims; reference being had to the accompanying drawings forming part of this specification, in which corresponding parts are designated by corresponding letters of reference.

In the drawings,—Figure 1 is a side elevation of my improved shock-absorber showing the manner of applying the same to a vehicle; the elliptical vehicle-spring being in expanded condition, such as it would assume in recovering itself after the vehicle passed through a rut or encountered an obstruction in the road. Fig. 2 is a similar view of the parts in normal position, such as it might assume when the vehicle is traveling along a smooth road and carrying a certain weight. Fig. 3 is a plan view of the device showing the same connected to the axle of a vehicle. Fig. 4 is an enlarged horizontal section through the spring and its casing, taken on line 4—4, Fig. 1. Fig. 5 is a vertical section taken on line 5—5, Fig. 1. Fig. 6 is a detached perspective view of one of the links forming the toggle which is connected to the extremities of the levers. Fig. 7 is a detached perspective view of the spring forming part of the absorber.

The reference letter A designates the frame of a vehicle or body, B one of the axles carrying the usual traction-wheels, and C one of the elliptical leaf springs mounted upon said axle and supporting the vehicle frame or body.

D designates my improved shock absorber which is intended to be used in connection with the rear springs of a vehicle, and if desired may also be used in connection with the front springs. This shock-absorber comprises a spring-retaining case or housing formed of two disks E having diverging levers $E^1$ formed integrally therewith, or if desired, secured thereto. Passing centrally through said disks is a spindle F having reduced outer ends $f$ which are threaded and which form shoulders arranged flush with the outer faces of the case or housing, and placed over said reduced ends are washers G against which bear nuts H threaded onto said reduced ends and held against rotation by means of jam-nuts $H^1$, also threaded onto said reduced ends and impinging against the outer faces of the nuts H. The disks E are held separated by a spacing sleeve I which surrounds the spindle and against the ends of which said disks bear; said sleeve providing an intervening space J between said disks in which is located a spiral spring K. Said spring has its ends bent laterally in opposite directions, as at $k$, $k^1$, and these ends are entered in openings L, $L^1$ formed in the disks, the opening $L^1$ in one disk being nearer to the axis of the case or housing than the opening L in the other disk. The course of the convolutions of the spring is such, that when the diverging levers $E^1$ are caused to swing toward each other, the spring uncoils; and as said levers separate, a reverse action of the spring takes place.

The ends of the levers $E^1$ are connected by a toggle M comprising two pivotally connected links $m$, $m^1$. As the levers $E^1$ lie in different planes, the links $m$, $m^1$ are provided with off-set portions at opposite ends so that they may be conveniently connected together and may also have their outer ends lie in contact with the sides of the levers $E^1$.

A bracket N is fastened to the frame of the vehicle and receives the outer end of the upwardly-directed lever $E^1$ and the upper end of the link $m$. The pivot pin $n$ connecting said lever with said link is passed through the bracket N so that a secure pivotal connection is obtained to the bracket while pivoting said link and lever together. A clevis O is secured to the axle B of the vehicle and has an upstanding lug $o$ through which is passed a pivot pin $o^1$ which serves to pivotally connect the outer end of the downwardly extending lever $E^1$ with the lower end of the link $m^1$ and both to said clevis. A retractile spring P of suitable power is provided which has one end secured to the frame of the vehicle, as at $p$, or to some other convenient fixed point, and its other end attached to the toggle M near its center pivot.

The operation of the device is as follows,—As the vehicle travels along a smooth road and carries a certain load, it may assume the position shown in Fig. 2; which, of course, is slightly varied according to increase or decrease of the weight carried on the elliptical springs. When the vehicle passes through a rut or strikes an obstruction in the road, the elliptical springs will become suddenly compressed causing the levers $E^1$ to move toward each other and by reason of their connection or formation with the disks E, the shock-absorbing spring K is caused to slightly uncoil itself. After the vehicle has passed through the rut or over the obstruction, the spring C expands or rebounds, and this rebounding action is checked to a certain extent by the shock-absorbing spring which recovers itself during such action due to the levers E, $E^1$ spreading and checks the rebounding action of the elliptical spring. The links $m$, $m^1$ of the toggle prevent expanding of the elliptical spring beyond a certain point; and if the rebounding action is sufficient to reach said point and cannot be checked by the shock-absorbing spring, the links $m$, $m^1$ are moved into a straight line and will not permit further expanding of the elliptical springs. At such times the retractile spring P acts to draw the links $m$, $m^1$ at an angle to each other, or in other words, serves to move the links out of the dead-center, so that the elliptical spring can close to the extent required to resiliently support the weight of the car-body.

Having thus described my invention, what I claim is,—

1. A shock-absorber comprising a spindle, a pair of disks mounted on said spindle and adapted for opposite rotation thereon, one of said disks having an opening near its axis and the other disk having an opening near its periphery, a sleeve surrounding said spindle and separating said disks, a spiral-spring surrounding said sleeve and having opposite ends bent laterally in opposite directions and fitting into the openings of said disks, and diverging levers on said disks adapted for connection to two different points of a vehicle.

2. A shock-absorber comprising a spindle having threaded reduced outer ends to provide shoulders thereon, disks mounted on said spindle and having their outer faces flush with said shoulders, a spacing-sleeve surrounding said spindle and separating said disks, nuts applied to the outer threaded ends of said spindle, a spiral-spring surrounding said sleeve and having opposite ends attached to opposite disks, and diverging levers on said disks adapted for connection to two different points of a vehicle.

3. The combination with a vehicle having an elliptical spring, of a shock-absorber comprising a housing having diverging levers and arranged to have opposite sides of said housing rotate in opposite directions, a spiral spring within said housing having opposite ends attached to opposite sides of said housing, a toggle between the outer ends of said diverging levers, the outer ends of said levers and said toggle being connected to the vehicle at points above and below the horizontal center of said elliptical spring, and a retractile-spring having one end attached to said toggle between the ends thereof and its opposite end attached to a fixed point.

In testimony whereof, I have affixed my signature in the presence of two subscribing witnesses.

GEORGE F. KERN.

Witnesses:
ELLA C. PLUECKHAHN,
EMIL NEUHART.

---

Copies of this patent may be obtained for five cents each, by addressing the "Commissioner of Patents, Washington, D. C."